Dec. 22, 1931.   A. E. MULHERN ET AL   1,837,574
DEMOUNTABLE WHEEL
Filed Feb. 26, 1929    3 Sheets-Sheet 1
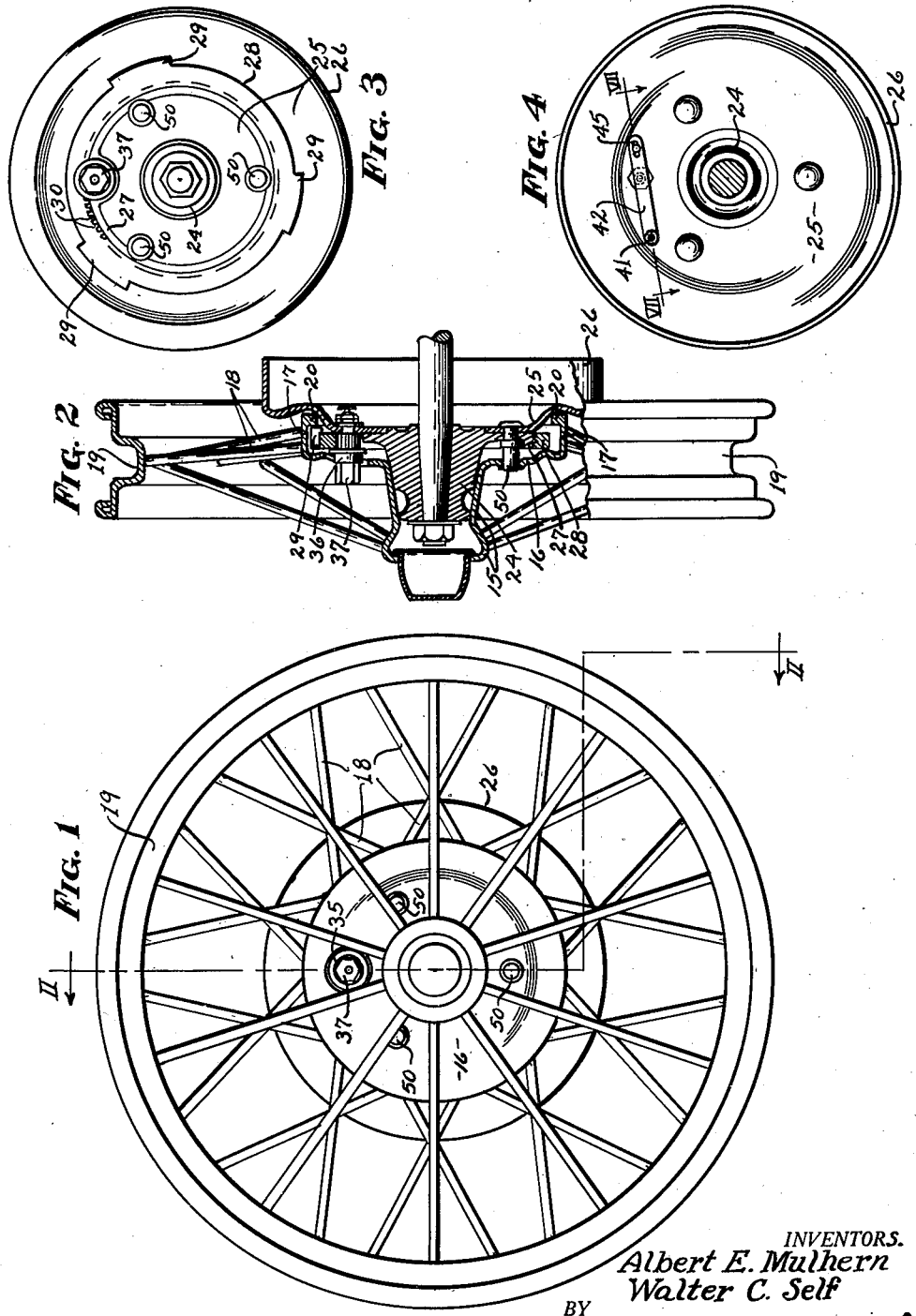
INVENTORS.
Albert E. Mulhern
Walter C. Self
BY William C. Edwards Jr.
ATTORNEY.

Dec. 22, 1931.  A. E. MULHERN ET AL  1,837,574
DEMOUNTABLE WHEEL
Filed Feb. 26, 1929   3 Sheets-Sheet 2
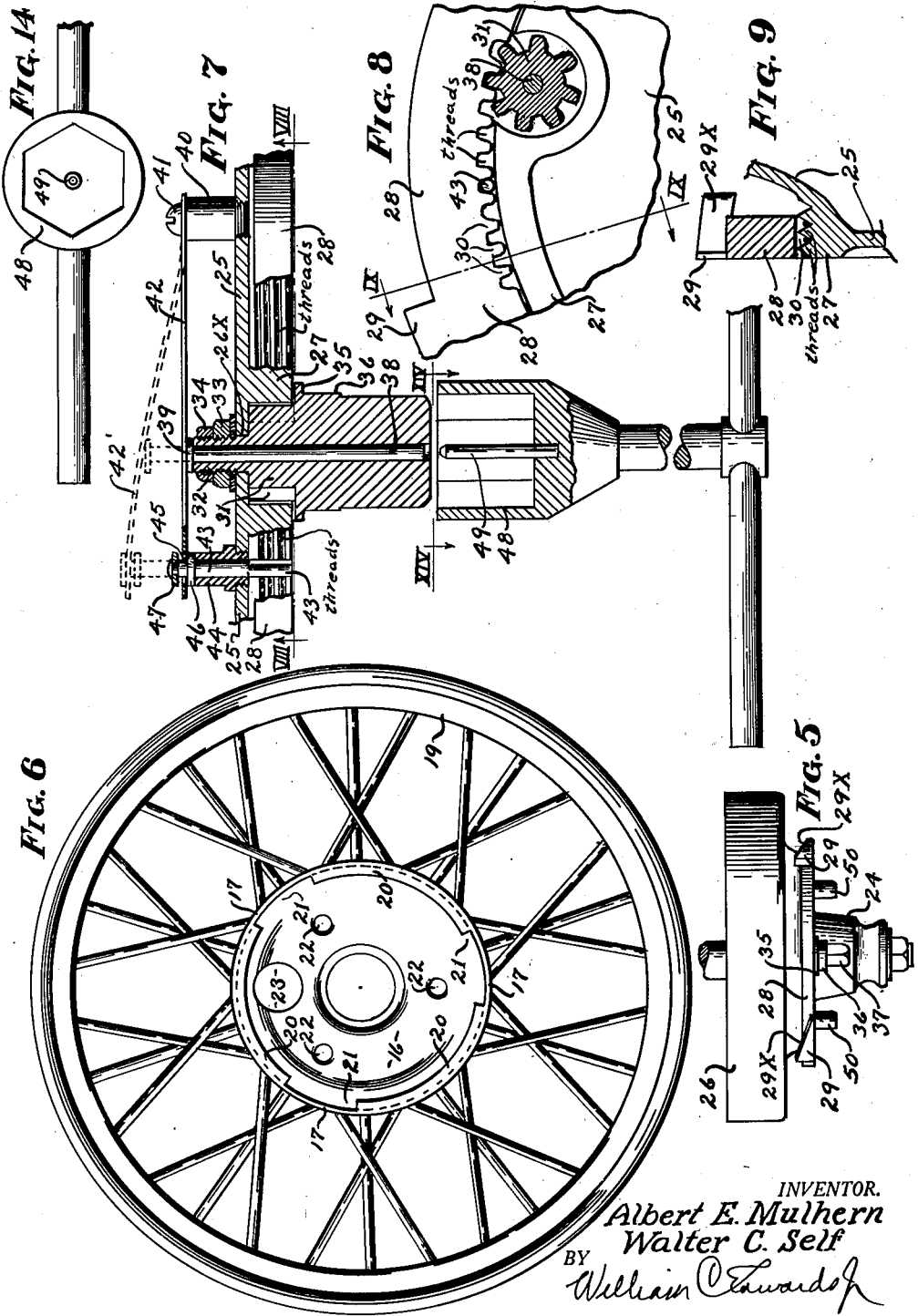
INVENTOR.
Albert E. Mulhern
Walter C. Self
BY
William C. Edwards Jr.
ATTORNEY.

Dec. 22, 1931.  A. E. MULHERN ET AL  1,837,574
DEMOUNTABLE WHEEL
Filed Feb. 26, 1929   3 Sheets-Sheet 3
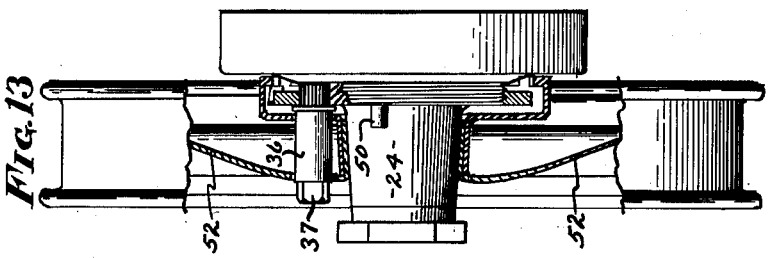
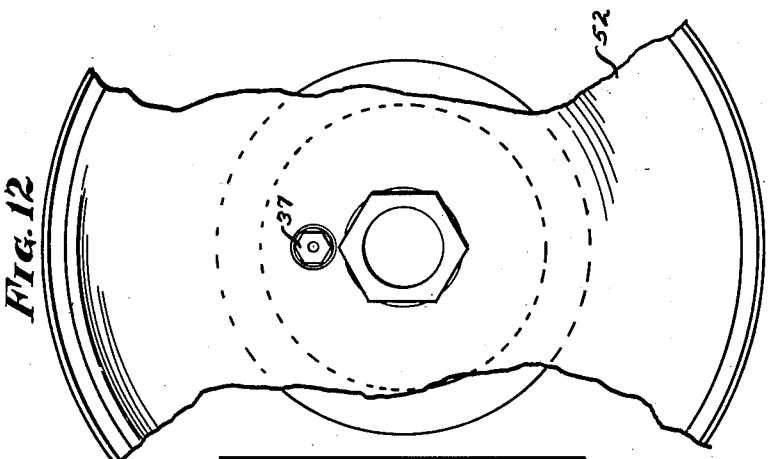
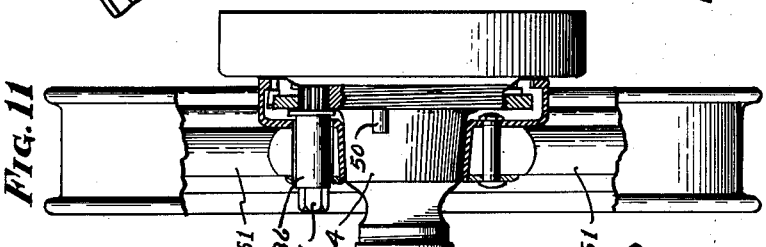
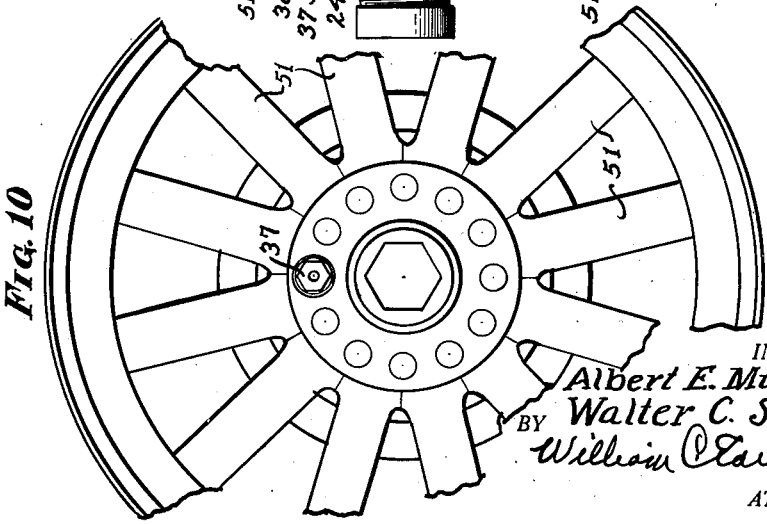
INVENTOR.
Albert E. Mulhern
Walter C. Self
BY
William C. Edwards
ATTORNEY.

Patented Dec. 22, 1931

1,837,574

UNITED STATES PATENT OFFICE

ALBERT E. MULHERN AND WALTER C. SELF, OF WICHITA, KANSAS

DEMOUNTABLE WHEEL

Application filed February 26, 1929. Serial No. 342,916.

The invention relates to demountable wheels, being for a somewhat similar purpose to that indicated in our prior application for Letters Patent, filed Nov. 30, 1928, Serial No. 322,621, covering a gear driven demountable rim.

The objects of the present invention are to provide a wheel which may be easily and quickly demounted from the hub of an automobile. Another object is to provide a wheel as described and one which when mounted on the hub of an automobile is rigidly locked thereon and whereby there is no possibility of its becoming loosened by vibration, sudden jars, bumps and the like.

Referring to the drawings, Fig. 1 shows a side view of the wheel mounted on the hub of an automobile and ready for use. Fig. 2 is an edge and sectional view of Fig. 1, as taken along the line II—II in Fig. 1. Fig. 3 is an outside view of the automobile hub and brake drum. Fig. 4 is a view of the back side of Fig. 3. Fig. 5 is a plan view looking down on Fig. 3. Fig. 6 is a view of the back side of Fig. 1. Fig. 7 is a full size sectional view taken along the line VII—VII in Fig. 4, and showing in section the operating wrench in position ready to be placed into engagement with the gear nut for operative purposes. Fig. 8 represents a view taken along the line VIII—VIII in Fig. 7. Fig. 9 shows a sectional view taken along the line IX—IX, Fig. 8. Fig. 10 is a side view of a wood wheel with the invention applied thereto. Fig. 11 is an edge view of Fig. 10 with parts broken away for convenience of illustration. Fig. 12 is a side view of a steel disc wheel, with the invention applied thereto. Fig. 13 is an edge view of Fig. 12 with parts broken away for convenience of illustration. Fig. 14 is a plan view of the operating wrench as seen from line XIV—XIV in Fig. 7. Similar numerals of reference indicate corresponding parts throughout all the figures of the drawings.

Referring to the drawings; in Figs. 1 and 2 are shown a wheel of the wire spoke type having a hub housing 15, flanging outwardly at 16 and then flanged backward at 17, forming a rim to which the wire spokes 18 are attached, the opposite ends of the spokes terminating in the rim proper 19 of the wheel. As shown in Figs. 2 and 6 there are inwardly projecting portions 20 on the part 17 and these portions are so spaced on such part 17 that equal open spaces 21 equally spaced apart are left at the ends of the portions 20. In the portion 16 are a plurality of holes 22 to receive studs as later described. At 23 is another hole through which passes a gear operating nut, as later described.

In Figs. 2, 3, 4 and 5 are shown the hub that is mounted as usual on the spindle or driving axle of the automobile. In these figures, 24 represents the main body of the hub which flanges downwardly as at 25 and is rigidly attached to or made integral with the brake drum 26. The flange 25 is curved, as shown in Fig. 2 thereby providing a shoulder 27 which is threaded on its surface to receive a threaded ring 28. On this ring 28 are wedge shaped lugs 29 projecting outwardly and they are of such size and so spaced that they will enter and pass through the openings 21 as shown in Fig. 6. Now referring to Figs. 2, 3, 7, 8 and 9, the ring 28 is shown provided with cog teeth 30 for a short distance, and these teeth mesh with the teeth on the cog gear wheel 31. The cog wheel 31 is provided with rearwardly extending sleeve portion 32, which is threaded to receive adjusting and lock nuts 33 and 34. The sleeve 32 extends through a hole 26x in the part 25, which forms a bearing for the sleeve supporting the cog wheel. In a flange 35 on the cog wheel 31, and on the side opposite the sleeve 32, is a sleeve like shoulder 36 which terminates in a nut shaped head 37. Through the structure just described extends a hole in which is placed a pin 38 provided with a head 39 to prevent the pin 38 from sliding through the hole. At 40 is shown a stud screwed or rigidly attached to the part 26. On this stud is affixed by the screw 41, a spring member 42, which passes over the head 39 on the pin 38 normally holding it to contact the end of the sleeve 32. The spring 42 continues on to a second pin 43, which is mounted in a sleeve stud 44 which is screwed or rigidly affixed to the member 26. The spring 42 is slotted as an elongated hole 45 to pass the pin 43. The pin 43 has a shoulder portion 46 and a washer 47 riveted to the top of the pin 43. The spring 42 being intermediate said shoulder 46 and the washer 47 and exerting spring pressure against the shoulder 46, forces the inner end of the pin 43 to extend through and engage between teeth 30 on the ring 28 thereby effecting a positive lock of the ring 28 on the shoulder 27 so that the ring 28 can not be turned.

Now a socket wrench 48 is provided with which the above described mechanism is operated. The wrench is provided with a pin 49 which contacts the end of the pin 38 when the wrench is placed on the nut 37. In placing the wrench completely on the nut 37, the pin 49 is forced inwardly to push the pin 38 inwardly to the dotted position where the head 39 forces the spring 42 to the dotted position 42' thereby removing the pin 43 from the threads and from the teeth 30 so that the wrench may be turned, thereby turning the cog wheel 31 to revolve the ring 28.

At 50 are shown studs rigidly attached to the member 25 and so spaced as to register and enter the holes 22 when the wheel is placed on the hub 24. In placing the wheel on the hub 24, the lugs 29 pass through the openings 21, then by turning the nut 37, the ring 28 is rotated so that the beveled portion 29x of each lug 29 contacts behind the member 20 and by reason of this, as the rotation of the ring advances, the wheel is pulled tightly on the hub 24. Now by turning the ring 28 still further, it will travel inward on account of the threads on which it is mounted and an additional tightening of the wheel on the hub is effected. Now by removing the wrench 48 from the nut 37, the pin 43 will again spring back into engagement between teeth 30 and the ring 28 and the lugs 29 are positively locked in place.

In Figs. 10 and 11 are shown the same construction as applied to a wooden wheel; and in Figs. 12 and 13 the same construction is seen applied to a steel disc wheel. The only difference is that the shoulder 36 is made longer than it is in the wire wheel type to make up for the extra thickness of wood spokes 51 or the steel disc 52.

Such modifications may be employed as lie within the scope of the appended claim.

Having fully disclosed our invention, what we now claim as new and desire to secure by Letters Patent is:

In demountable wheels, the combination of a peripherally threaded hub flange and an internally threaded locking ring mounted thereon, said locking ring having locking lugs at spaced intervals; teeth formed on the threaded surface of the locking ring and a cog wheel rotatably mounted in the hub flange and engaging said teeth; a wheel having a hub shell flanging radially outwardly for a distance and then flanged axially inward as a rim element and a plurality of lug portions projecting radially inwardly from the outer edge of the rim element and spaced apart at equal intervals to permit passage of the locking lugs of the ring within the rim element and a subsequent rotating movement of the locking ring within the shell rim for a locking engagement of the ring lugs against the lugs of the rim element.

In testimony whereof we affix our signatures.

ALBERT E. MULHERN.
WALTER C. SELF.